US012278672B2

(12) United States Patent
Higashi et al.

(10) Patent No.: US 12,278,672 B2
(45) Date of Patent: Apr. 15, 2025

(54) COMPUTING APPARATUS AND MARGIN MEASUREMENT METHOD

(71) Applicant: Hitachi, Ltd., Tokyo (JP)

(72) Inventors: Ryota Higashi, Tokyo (JP); Masao Ogihara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 345 days.

(21) Appl. No.: 17/940,569

(22) Filed: Sep. 8, 2022

(65) Prior Publication Data

US 2023/0198573 A1  Jun. 22, 2023

(30) Foreign Application Priority Data

Dec. 16, 2021  (JP) ................................ 2021-203988

(51) Int. Cl.
*H04B 3/487* (2015.01)
*H04L 25/08* (2006.01)

(52) U.S. Cl.
CPC ........... *H04B 3/487* (2015.01); *H04L 25/085* (2013.01)

(58) Field of Classification Search
None
See application file for complete search history.

(56) References Cited

U.S. PATENT DOCUMENTS

| 2008/0116992 | A1* | 5/2008 | Kishigami | ............... H04L 1/24 333/101 |
| 2008/0240212 | A1 | 10/2008 | Satou | |
| 2009/0140766 | A1 | 6/2009 | Hiraishi et al. | |
| 2012/0273655 | A1* | 11/2012 | Ise | ...................... H04N 25/633 250/208.1 |
| 2020/0202818 | A1* | 6/2020 | Kuroiwa | .............. G09G 3/2096 |
| 2020/0249275 | A1* | 8/2020 | Froelich | ............... G06F 11/273 |
| 2020/0333396 | A1 | 10/2020 | Zhao et al. | |

FOREIGN PATENT DOCUMENTS

| JP | 2008-109634 A | 5/2008 |
| JP | 2009-135644 A | 6/2009 |

OTHER PUBLICATIONS

Japanese Patent Office, Notice of Reasons for Refusal for JP Application No. 2021-203988, dated Sep. 5, 2023, in 9 pages.

* cited by examiner

*Primary Examiner* — Hong S Cho
(74) *Attorney, Agent, or Firm* — Procopio, Cory, Hargreaves & Savitch LLP

(57) ABSTRACT

A computing apparatus, includes a first apparatus and a second apparatus, a differential transmission line that couples the first apparatus and the second apparatus to each other, a noise application unit that applies noise to the differential transmission line, a noise control unit that controls the noise application unit, and a margin measurement unit that measures an occurrence frequency of communication error between the first apparatus and the second apparatus.

5 Claims, 13 Drawing Sheets

FIG. 1
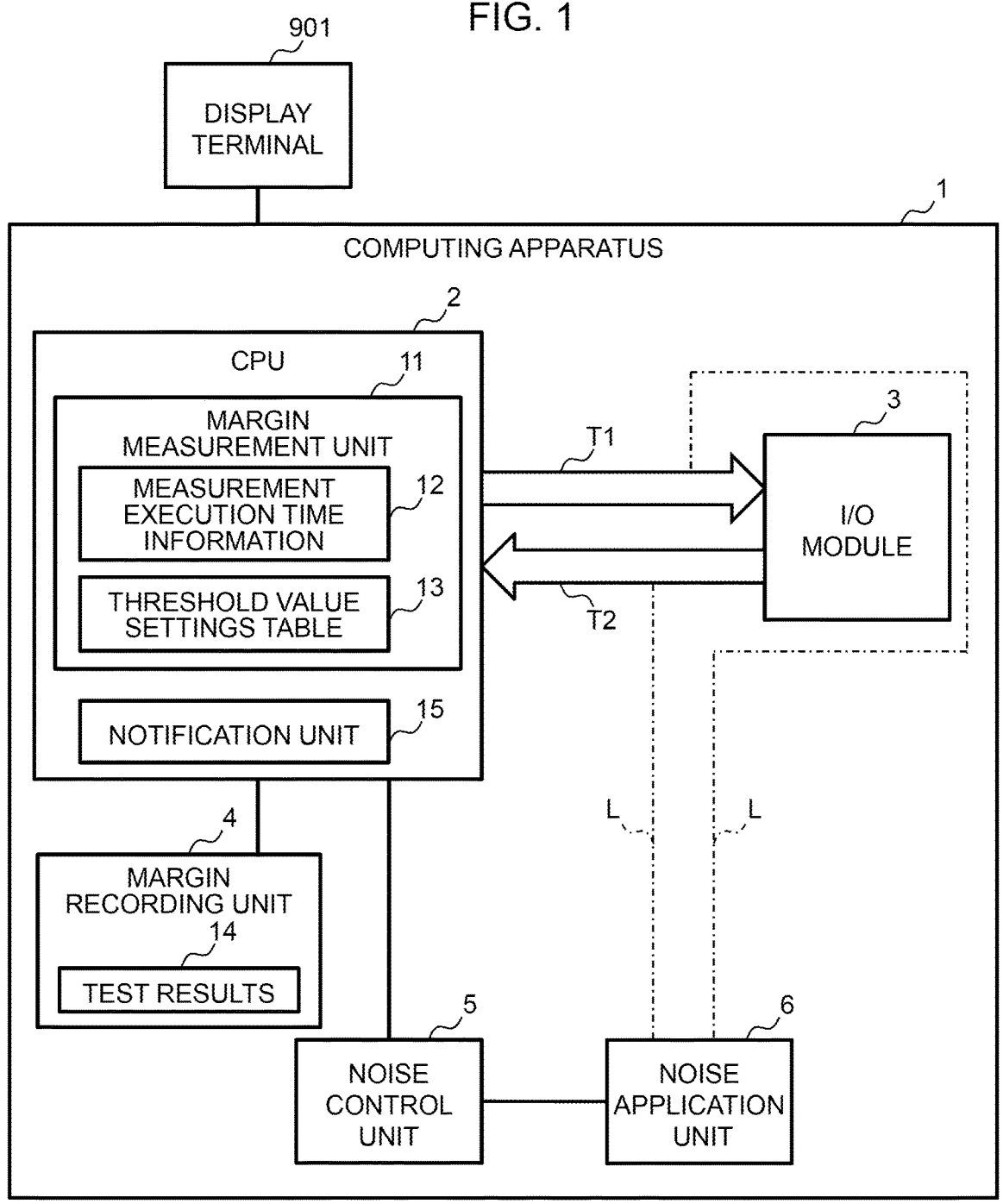
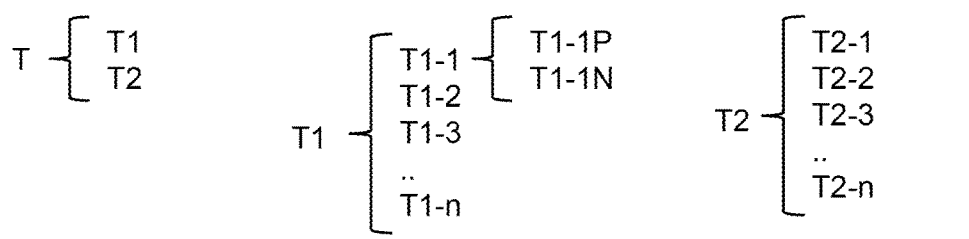

FIG. 3

| TEST RESULTS | | | | |
|---|---|---|---|---|
| OFFSET TEST RESULTS | | | | |
| START TIME POINT | END TIME POINT | OFFSET CURRENT | NUMBER OF CPU ERROR COUNTS | NUMBER OF I/O MODULE ERROR COUNTS |
| Ts1s | Ts1e | 0.5mA | 0 | 0 |
| Ts2s | Ts2e | 0.5mA | 1 | 0 |
| Ts3s | Ts3e | 0.5mA | 2 | 1 |
| ... | ... | ... | ... | ... |
| ... | ... | ... | ... | ... |
| CROSSTALK TEST RESULTS | | | | |
| START TIME POINT | END TIME POINT | PULSE AMPLITUDE | NUMBER OF CPU ERROR COUNTS | NUMBER OF I/O MODULE ERROR COUNTS |
| Tx1s | Tx1e | 200mV | 0 | 0 |
| Tx2s | Tx2e | 300mV | 1 | 0 |
| Tx3s | Tx3e | 500mV | 2 | 1 |
| ... | ... | ... | ... | ... |

FIG. 5
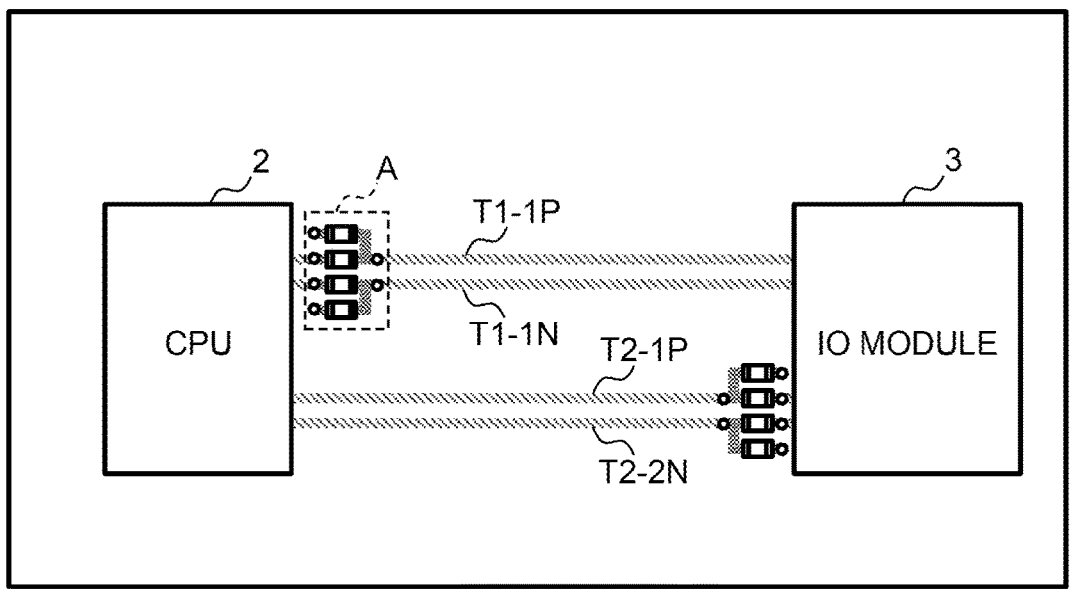
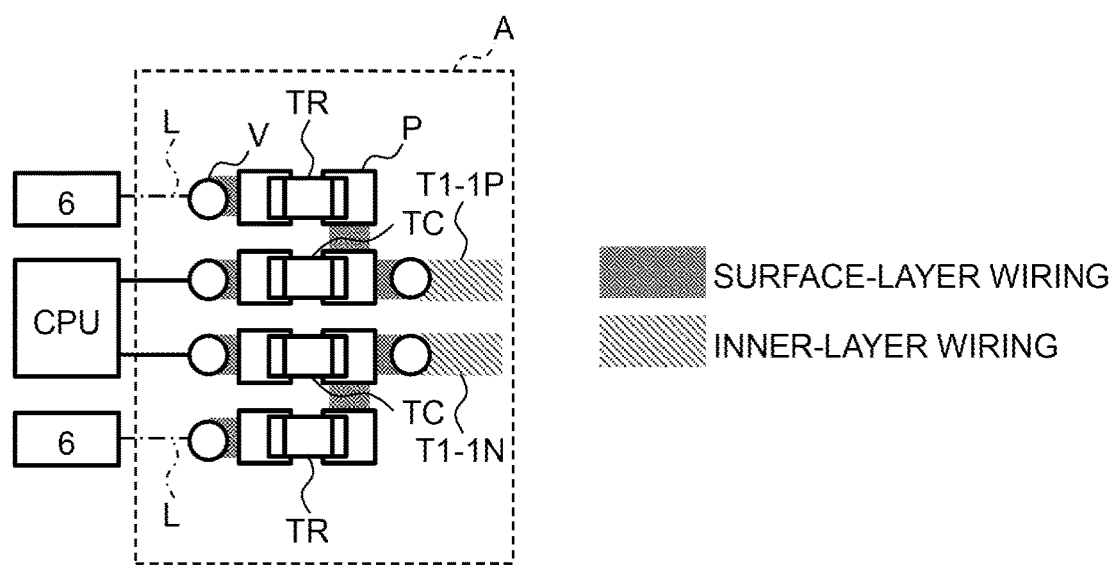
SURFACE-LAYER WIRING
INNER-LAYER WIRING
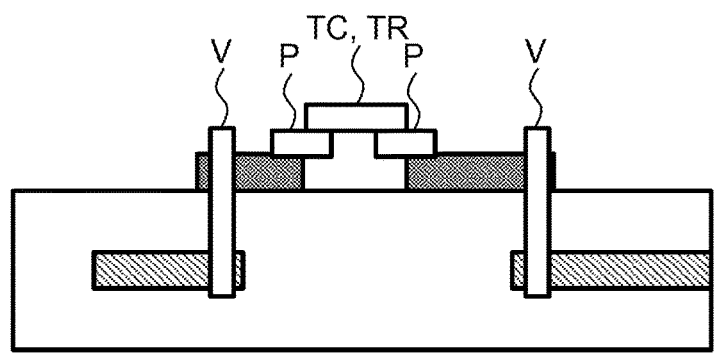

FIG. 6
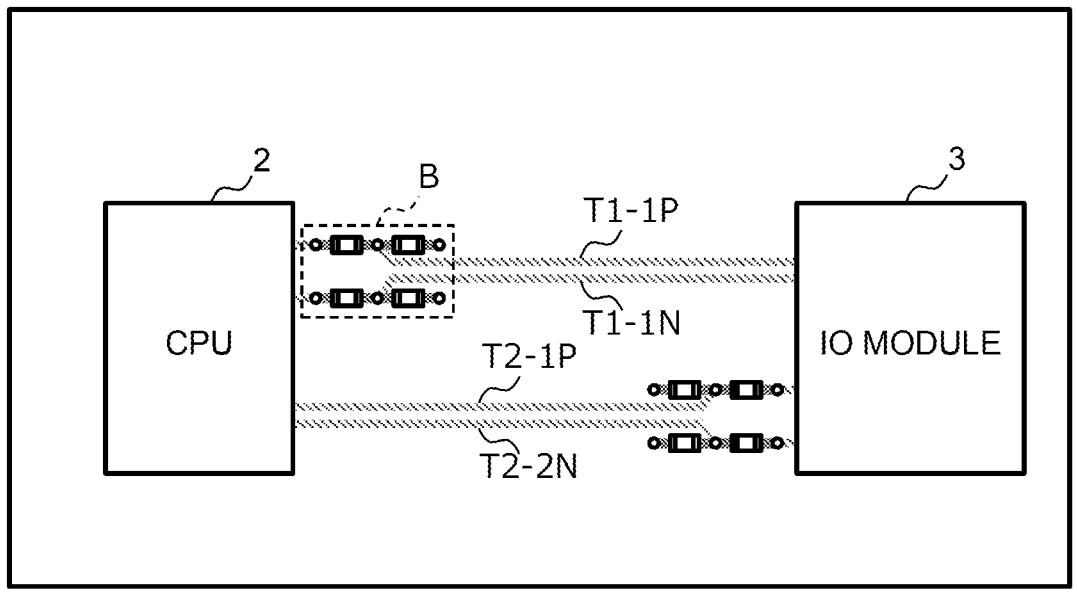
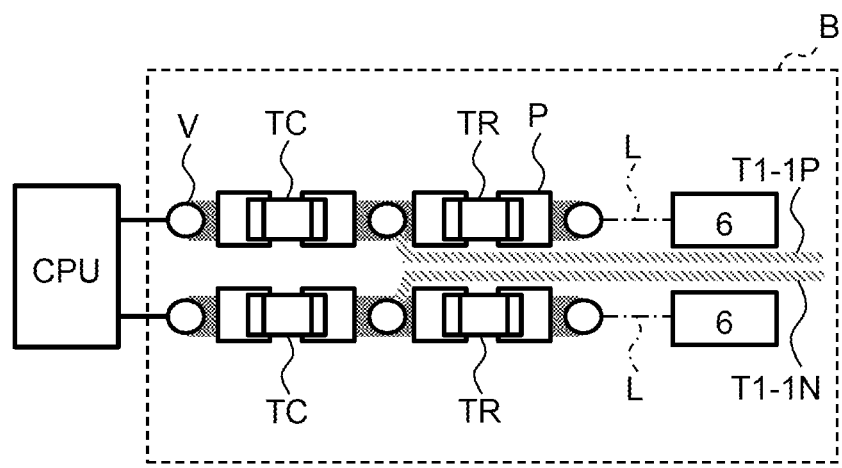
SURFACE-LAYER WIRING
INNER-LAYER WIRING

FIG. 8
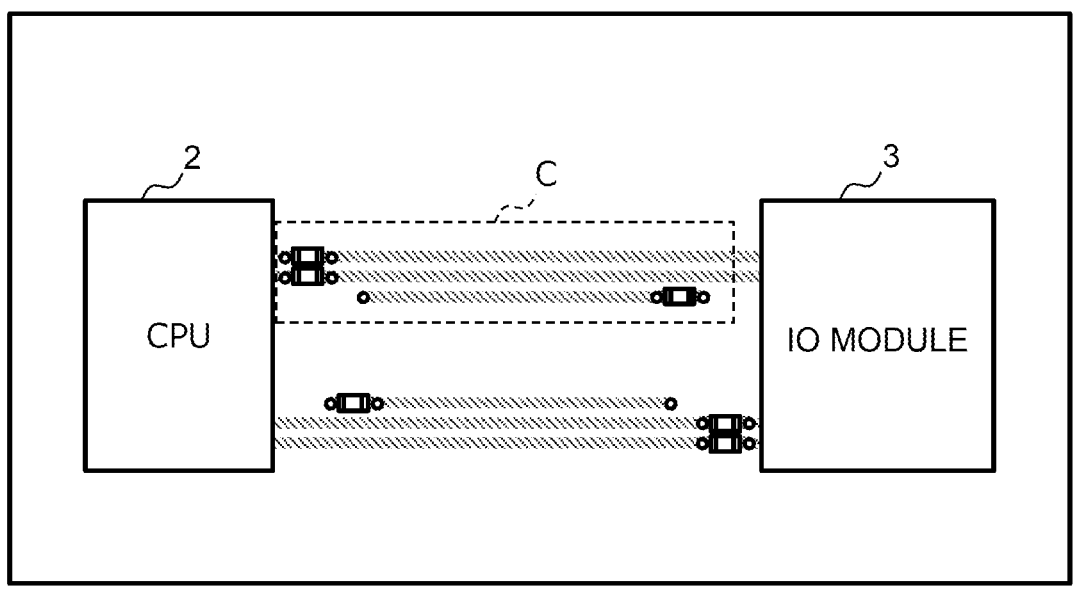
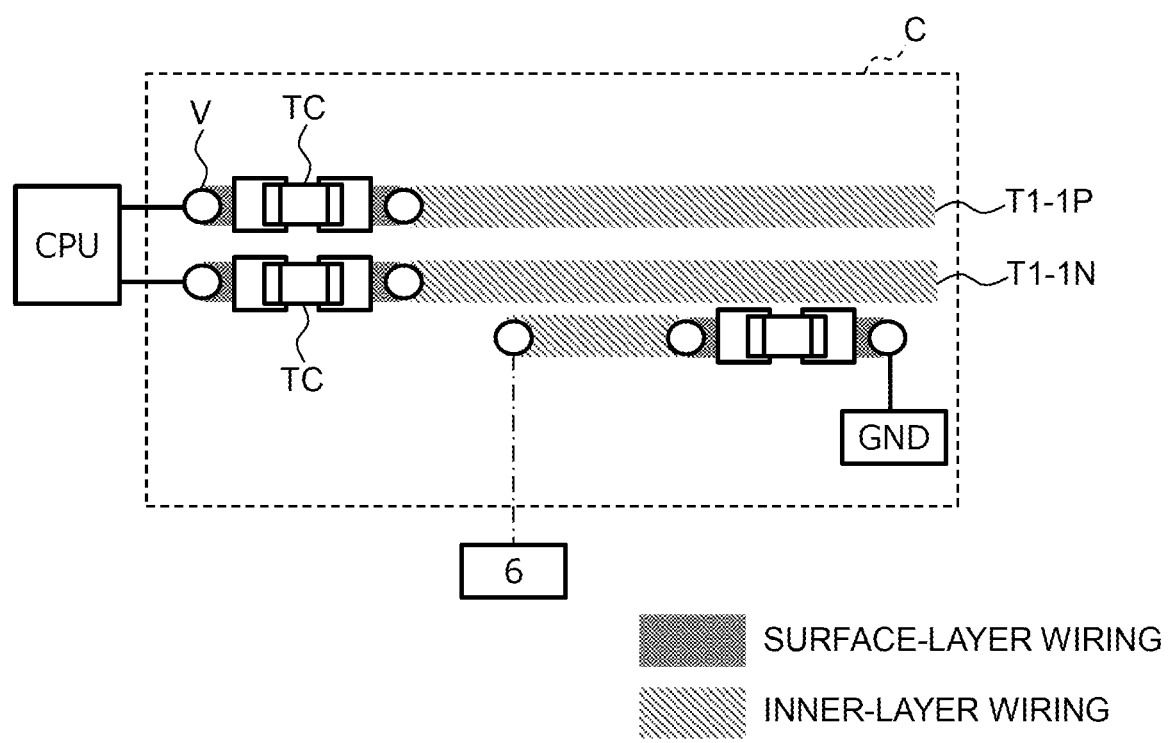

COMPUTING APPARATUS AND MARGIN MEASUREMENT METHOD

BACKGROUND OF THE INVENTION

1. Field of the Invention

The present invention relates to a computing apparatus and a margin measurement method.

2. Description of the Related Art

Differential transmission lines that transmit information using voltage difference of two signal lines are in widespread use, due to high resistance to noise. Japanese Patent Application Publication No. 2009-135644 discloses a signal transmission circuit that includes first and second transmission lines coupled to each other, a first impedance storage circuit that stores impedance of the first transmission line, and a control circuit that outputs matching information of impedance of the second transmission line and impedance stored in the first impedance storage circuit.

PATENT LITERATURE

Japanese Patent Application Publication No. 2009-135644

SUMMARY OF THE INVENTION

The invention described in Japanese Patent Application Publication No. 2009-135644 is not capable of measuring operation margin while operating.

According to the 1st aspect of the present invention, a computing apparatus including, a first apparatus and a second apparatus, a differential transmission line that couples the first apparatus and the second apparatus to each other, a noise application unit that applies noise to the differential transmission line, a noise control unit that controls the noise application unit, and a margin measurement unit that measures an occurrence frequency of communication error between the first apparatus and the second apparatus.

According to the 2nd aspect of the present invention, a margin measurement method that is executed by a computing apparatus, including a first apparatus, a second apparatus, and a differential transmission line that couples the first apparatus and the second apparatus to each other, the margin measurement method including, applying noise to the differential transmission line, and measuring an occurrence frequency of communication error between the first apparatus and the second apparatus.

According to the present invention, operation margin can be measured while the computing apparatus is operating.

BRIEF DESCRIPTION OF THE DRAWINGS

FIG. 1 is a configuration diagram of a computing apparatus;

FIG. 3 is a diagram showing an example of test results;

FIG. 5 is a diagram illustrating a first implementation example of a differential transmission line corresponding to FIG. 4;

FIG. 6 is a diagram illustrating a second implementation example of a differential transmission line corresponding to FIG. 4;

FIG. 8 is a diagram illustrating an implementation example of a differential transmission line corresponding to FIG. 7;

DESCRIPTION OF THE PREFERRED EMBODIMENTS

First Embodiment

Figure 2:
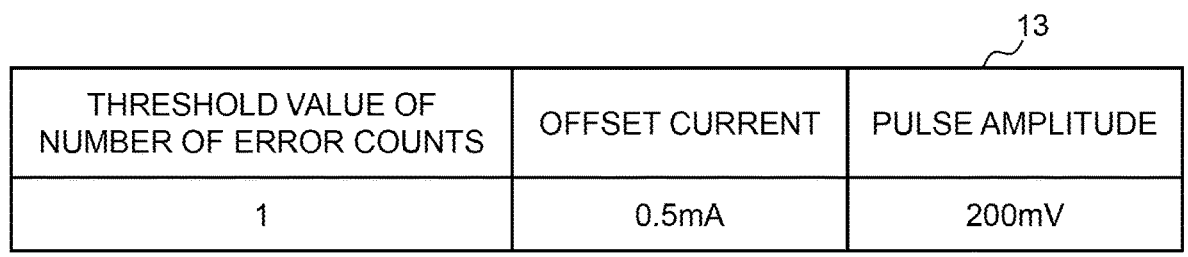
FIG. 2 is a diagram showing an example of a threshold value settings table.

A first embodiment of a computing apparatus will be described below with reference to FIGS. 1 to 13.

FIG. 1 is a configuration diagram of a computing apparatus 1. The computing apparatus 1 includes a central processing unit (CPU) 2, an input/output (IO) module 3, a margin recording unit 4, a noise control unit 5, a noise application unit 6, a differential transmission line T, and testing wiring L. The CPU 2 and the I/O module 3 are coupled by the differential transmission line T. The differential transmission line T is made up of a first differential transmission line T1 and a second differential transmission line T2. The first differential transmission line T1 is used for transmission of information from the CPU 2 to the I/O module 3. The second differential transmission line T2 is used for transmission of information from the I/O module 3 to the CPU 2.

The CPU 2 is a central processing unit. The CPU 2 executes various types of computation processing, and performs communication with other hardware built into the computing apparatus 1. A known technique for detecting errors in this communication is implemented in the CPU 2. This known technique may be implemented as hardware, or may be implemented as software. The I/O module 3 is an apparatus that inputs external signals and externally outputs signals.

The terms "first differential transmission line T1" and "second differential transmission line T2" are collective terms of transmission lines, and a plurality of sets of transmission lines exist between the CPU 2 and the I/O module 3. That is to say, the first differential transmission line T1 is a collective term for a No. 1-1 differential transmission line T1-1, a No. 1-2 differential transmission line T1-2, and so on through a No. 1-n differential transmission line T1-n, that transmit information from the CPU 2 to the I/O module 3. Also, the second differential transmission line T2 is a collective term for a No. 2-1 differential transmission line T2-1, a No. 2-2 differential transmission line T2-2, and so on through a No. 2-n differential transmission line T2-n, that transmit information from the I/O module 3 to the CPU 2. Also, each of the differential transmission lines is a pair, i.e., includes two signal lines. Here, these will be distinguished by suffixes P and N for the sake of convenience. For example, the No. 1-1 differential transmission line T1-1 includes a differential transmission line T1-1P and a differential transmission line T1-1N. The pair of differential transmission lines may also be referred to as "P line" and "N line" below.

The first differential transmission line T1 and the second differential transmission line T2 have resistance to noise, but this is limited, and being subjected to strong noise has adverse effects on communication. In the present embodiment, an operating margin, which is a leeway up to where noise affects communication, is measured while the computing apparatus 1 is running. Note that measurement of the operating margin will also be referred to as "margin measurement" below.

The CPU 2 has a margin measurement unit 11 and a notification unit 15. The margin measurement unit 11 has measurement execution time information 12 and a threshold value settings table 13. Note however, that the term "has" here is a conceptual idea. Having the measurement execution time information 12 and the threshold value settings table 13 recorded in hardware of the CPU 2, such as in a register for example, is not an indispensable configuration, and it is sufficient for the measurement execution time information 12 and the threshold value settings table 13 to be recorded in a saving area that the margin measurement unit 11 realized by the CPU 2 is free to access, such as the margin recording unit 4, for example.

A time interval for performing margin measurement, such as a value of, for example, "60 minutes" or the like, is set to the measurement execution time information 12 in advance. Values reference in the margin measurement are set in advance in the threshold value settings table 13. A specific example of the threshold value settings table 13 will be described later. The margin recording unit 4 is a storage apparatus, and test results 14 are recorded in the margin recording unit 4. The margin recording unit 4 preferably is a nonvolatile storage apparatus, such as flash memory for example, but may be a volatile storage apparatus, such as dynamic random access memory (DRAM) for example.

The margin measurement unit 11 instructs the noise control unit 5 with respect to the amount of noise to apply. The notification unit 15 performs notification of measurement results of measurement performed by the margin measurement unit 11. As for notification, the notification unit 15 performs display of test contents and the number of errors on a display terminal 901 coupled to the computing apparatus 1, for example. In a case in which the display terminal 901 is a liquid crystal display for example, the notification unit 15 is a video output apparatus that outputs video signals. In a case in which the display terminal 901 is a general-purpose computer for example, the notification unit 15 is a network interface card, for example.

The noise control unit 5 controls the noise application unit 6 and applies noise to the first differential transmission line T1 and the second differential transmission line T2. Note that while the noise control unit 5 exists on the outside of the CPU 2 in FIG. 1, the noise control unit 5 may be realized by the CPU 2. The noise application unit 6 is a current voltage source, and applies noise to the first differential transmission line T1 and the second differential transmission line T2 using the testing wiring L. Note that the testing wiring L indicated by the chain line in FIG. 1 is schematic, and a specific configuration will be described later.

The margin measurement unit 11 measures the frequency of error occurring in signals sent over the second differential transmission line T2. The margin measurement unit 11 then records the error measurement results in the margin recording unit 4. Next, the margin measurement unit 11 applies noise of a different noise amount to the first differential transmission line T1 and the second differential transmission line T2, via the noise control unit 5 and via the noise application unit 6. Thereafter, the margin measurement unit 11 measures the frequency of error occurring in signals sent over the first differential transmission line T1 again, and records the results in the margin recording unit 4. In the present embodiment, two types of tests, which are an offset test and a crosstalk test, are performed, which will be described in detail later.

FIG. 2 is a diagram showing an example of the threshold value settings table 13. The threshold value settings table 13 stores in advance a threshold value of the number of error counts, and values of offset current and pulse amplitude used for margin measurement. The value of the offset current is referenced in the offset test, and the value of the pulse amplitude is referenced in the crosstalk test. In the example shown in FIG. 2, the threshold value for the number of error counts is set to "1", the offset current to "0.5 mA", and the pulse amplitude to "200 mV".

FIG. 3 is a diagram illustrating an example of test results 14. Stored in the test results 14 are offset test results and crosstalk test results. Results of a plurality of offset tests are included in the offset test results. Each of the offset test results includes start time point, end time point, offset current, number of CPU error counts, and number of I/O module error counts.

The start time point and the end time point are the time point at which the test was started and the time point at which the test ended. Although each time point is represented by a single variable in FIG. 3, for the sake of convenience in creating the Figures, "Ts1s" is a specific value in the format of, indicating a specific point in time such as "21 seconds past 3:45 on Dec. 1, 2021". The offset current is the value of the current used for the offset test. The number of CPU error counts is the number of error counts of the CPU 2 detected in that offset test. The number of I/O module error counts is the number of error counts of the I/O module 3 detected in that offset test.

Results of a plurality of crosstalk tests are included in the crosstalk test results. Each of the crosstalk test results includes start time point, end time point, pulse amplitude, number of CPU error counts, and number of I/O module error counts. The start time point and the end time point are the time point of starting the test and the time point of ending the test. The pulse amplitude is the value of the current used for the crosstalk test. The number of CPU error counts is the number of error counts of the CPU 2 detected in that crosstalk test. The number of I/O module error counts is the number of error counts of the I/O module 3 detected in that crosstalk test.

Figure 4:
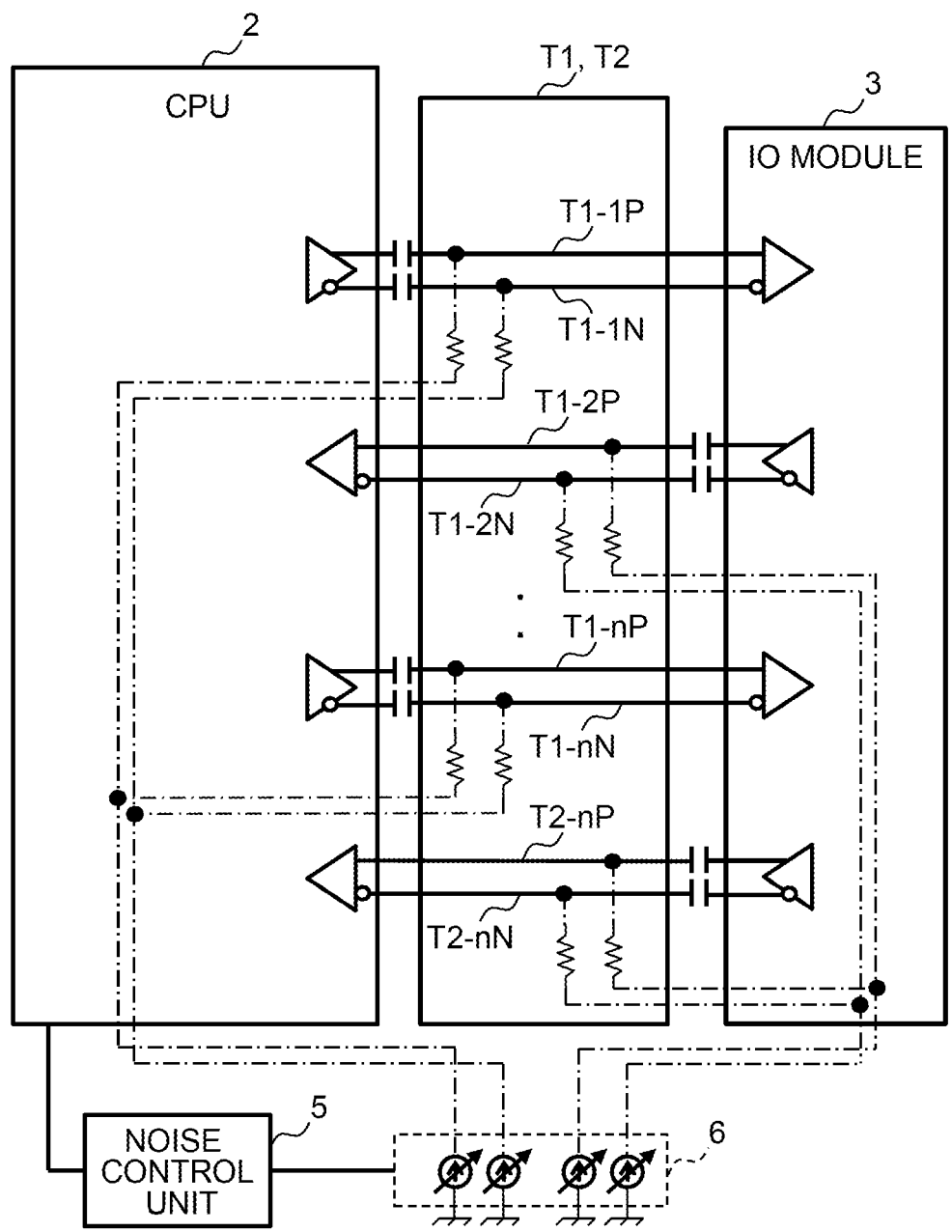
FIG. 4 is a diagram illustrating testing wiring in offset testing.

FIG. 4 is a diagram illustrating the testing wiring L used in the offset test. The testing wiring L is indicated by a chain line in FIG. 4, to differentiate from other lines. In the offset test, voltage is applied to both of the pair of signal lines included in the differential transmission line. For realization thereof, each lane is coupled to the noise application unit 6 that is a voltage source, via a predetermined resistor, such as a 1 kΩ resistor, for example. Specifically, all of the differential transmission line T1-1P, differential transmission line T1-1N, differential transmission line T2-1P, differential transmission line T2-2P, differential transmission line T1-2P, and so on, are coupled to the noise application unit 6 via resistors. The testing wiring L used for the offset test is the chain line wiring including the resistors.

FIG. 5 is a diagram illustrating a first implementation example of a differential transmission line corresponding to FIG. 4. The upper side of FIG. 5 illustrates the entirety of a pair of differential transmission lines, the middle in FIG. 5 is an enlarged view of portion A, and the lower side of FIG. 5 is a schematic diagram in a depth direction of portion A. In FIG. 5, the dotted shading indicates surface-layer wiring, i.e., wiring that is present on the surface of a substrate. In FIG. 5, the hatching indicates inner-layer wiring, i.e., wiring that is present within the substrate. The shading and hatching mean the same in FIG. 6 and thereafter as well. The surface-layer wiring and the inner-layer wiring are coupled by vias V, as illustrated on the lower side in FIG. 5.

As illustrated in the middle in FIG. 5, each lane making up the differential transmission line has chip capacitors TC mounted on the surface of the substrate. Also, the resistors included in the testing wiring L are mounted on the surface of the substrate as chip resistors TR. The chip capacitors TC and the chip resistors TR are coupled to the surface-layer wiring via pads P. The vias V that are coupled to from the chip capacitors TC via the pads P and the surface-layer wiring are coupled to the CPU 2. The vias V that are coupled to from the chip resistors TR via the pads P and the surface-layer wiring are coupled to the noise application unit 6. In the implementation example illustrated in FIG. 5, the chip capacitors TC and the chip resistors TR are disposed arrayed as to the CPU 2. Accordingly, while a broad area is necessary at the side adjacent to the CPU 2, restriction on the width of the differential transmission line T1-1P and the differential transmission line T1-1N, in other words on the breadth thereof, is lenient.

FIG. 6 is a diagram illustrating a second implementation example of a differential transmission line corresponding to FIG. 4. Points of difference with respect to FIG. 5 will primarily be described here. The upper side of FIG. 6 illustrates the entirety of a pair of differential transmission lines, and the lower side of FIG. 6 is enlarged view of portion A. The schematic diagram in a depth direction is the same as in FIG. 5, and accordingly is omitted. FIG. 6 corresponds to FIG. 4 in the same way as in FIG. 5, and accordingly the point of being coupled to the noise application unit 6 via the chip resistors TR is the same. Note however, that in FIG. 6, the chip resistors TR are serially disposed with the chip capacitors TC with respect to the CPU 2. Accordingly, while a broad area is not necessary at the side adjacent to the CPU 2, restriction on the width of the differential transmission line T1-1P and the differential transmission line T1-1N, in other words on the breadth thereof, is strict.

Figure 7:
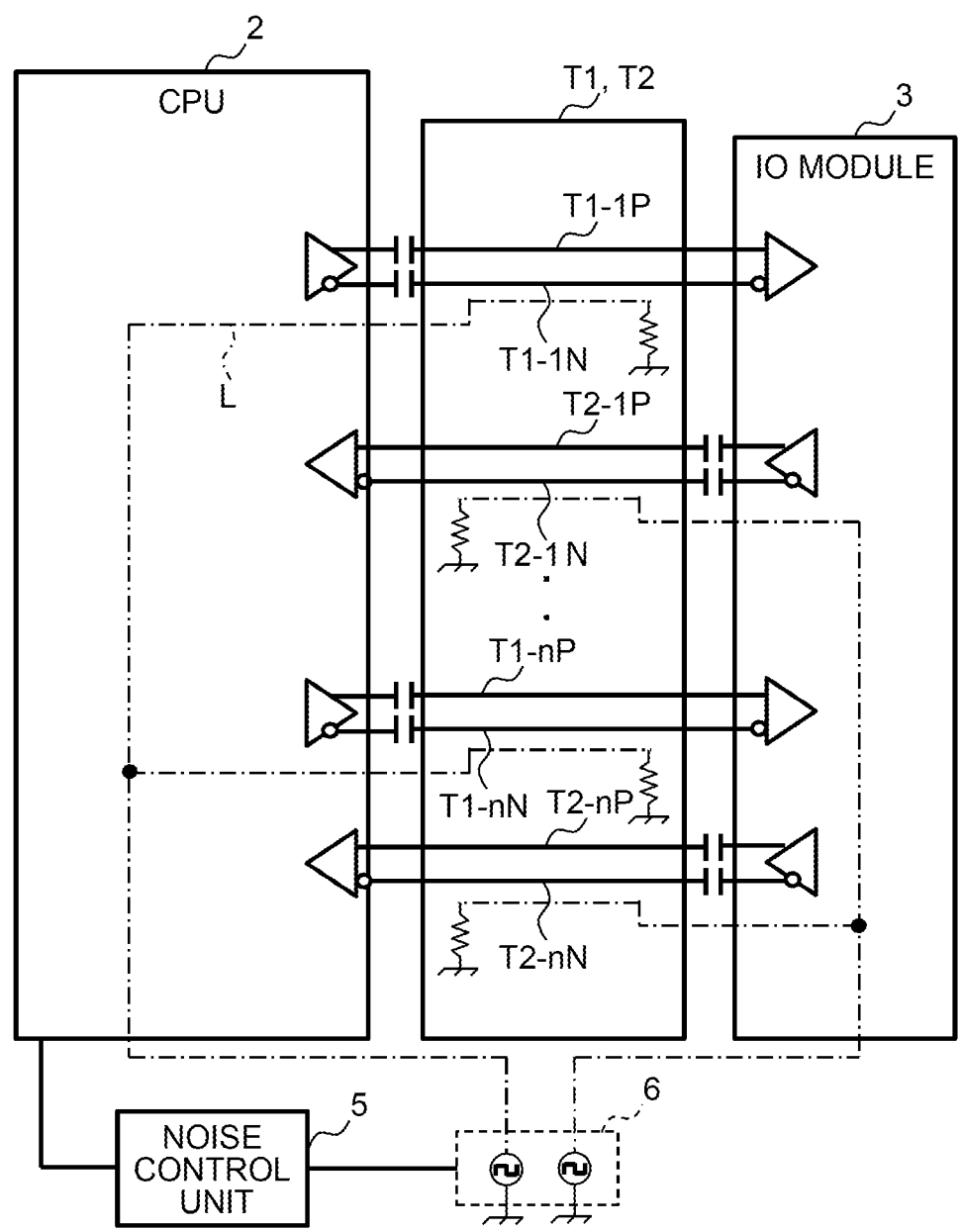
FIG. 7 is a diagram illustrating testing wiring in crosstalk testing.

FIG. 7 is a diagram illustrating the testing wiring L in the crosstalk test. The testing wiring L is indicated by a chain line in FIG. 7, to differentiate from other lines. The testing wiring L used in the crosstalk test is disposed in parallel over a predetermined section of a pair of signal lines included in the differential transmission line. One end of this testing wiring L is coupled to the noise application unit 6, and the other end is coupled to ground potential via a resistor of a predetermined value, e.g., a resistor of 50Ω. The distances from each of the two signal lines making up the pair of differential transmission lines to the testing wiring L are made to differ, thereby imparting strong effects on just one of the signal lines, which causes crosstalk to occur. In the example illustrated in FIG. 7, the testing wiring L is disposed closer to the N-side wiring than the P-side wiring, and accordingly the testing wiring L strongly affects the N-side wiring.

FIG. 8 is a diagram illustrating an implementation example of the differential transmission line T corresponding to FIG. 7. The upper side of FIG. 8 illustrates the entirety of a pair of differential transmission lines, and the lower side of FIG. 8 is enlarged view of portion C. In the upper side in FIG. 8, the portion C indicated by dashed lines includes a part of the differential transmission line T1-1P and the testing wiring L, for example. In the portion C, the differential transmission line T1-1P, the differential transmission line T1-1N, and the testing wiring L are disposed in parallel. Of the three lines, the differential transmission line T1-1N is disposed in the middle, and accordingly, the distance from the differential transmission line T1-1N to the testing wiring L is always shorter than the distance from the differential transmission line T1-1P to the testing wiring L. Accordingly, the differential transmission line T1-1N is readily affected by the testing wiring L.

Figure 9:
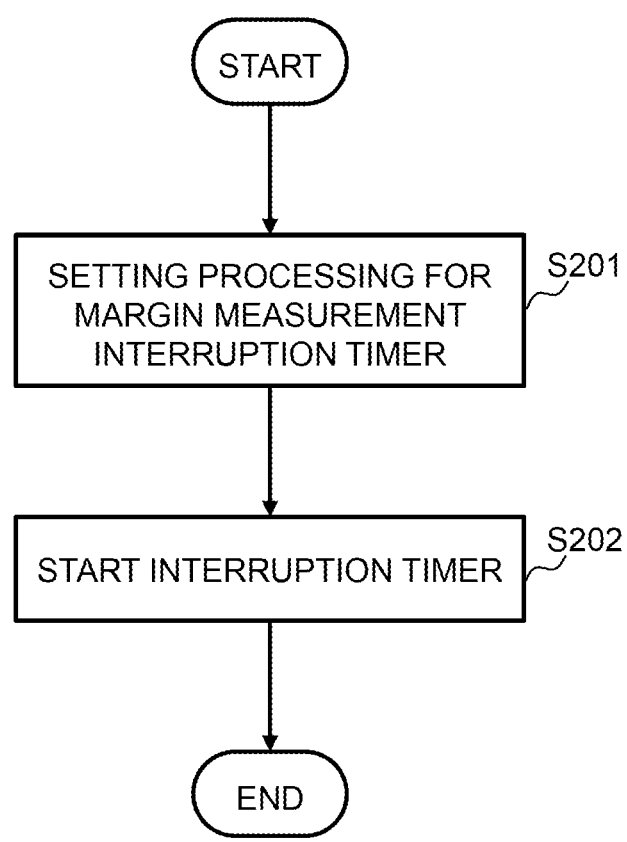
FIG. 9 is a flowchart showing processing when starting a computing apparatus 1.

FIG. 9 is a flowchart showing processing when starting the computing apparatus 1. In step S201, the CPU 2 references the measurement execution time information 12 and performs setting processing for an interruption timer for margin measurement. By setting this timer, margin measurement is performed every predetermined amount of time, e.g., every "60 minutes". In the following step S202, the CPU 2 starts the interruption timer set in step S201, and ends the processing shown in FIG. 9.

Figure 10:
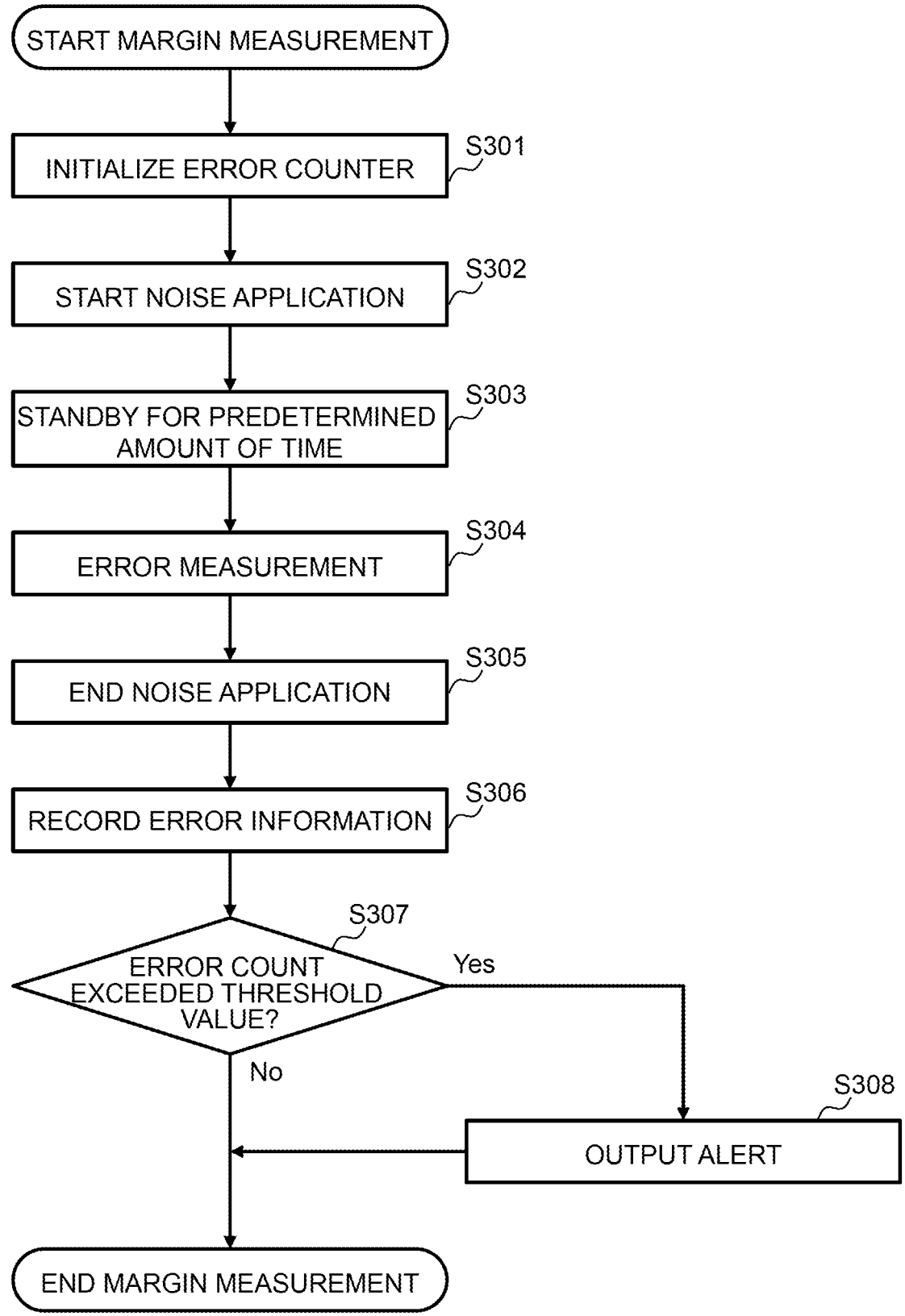
FIG. 10 is a flowchart showing margin measurement processing.

FIG. 10 is a flowchart showing margin measurement processing. In step S301, the margin measurement unit 11 initializes an error counter. In the following step S302, the margin measurement unit 11 starts noise application using the noise control unit 5 and the noise application unit 6. A specific method of noise application will be described later. In step S303 thereafter, the margin measurement unit 11 stands by for a predetermined amount of time. In the subsequent step S304, the margin measurement unit 11 measures errors at the CPU 2 and the I/O module 3. Specifically, the errors of each are measured using the error detection techniques included in the CPU 2 and the I/O module 3.

In the following step S305, noise application is ended, and in the subsequent step S306, the margin measurement unit 11 records the measured error information in the margin recording unit 4. In step S307, the margin measurement unit 11 then judges whether or not the number of errors, i.e., the error count measured in step S304 exceeds the threshold value. The threshold value in this step is the value entered in the threshold value settings table 13. In a case of judging that the threshold value is exceeded, the margin measurement unit 11 advances to step S308, and performs notification using the notification unit 15. In a case of judging that the threshold value is not exceeded, and in a case in which the processing of step S308 ends, the margin measurement unit 11 ends the processing shown in FIG. 10.

Figure 11:
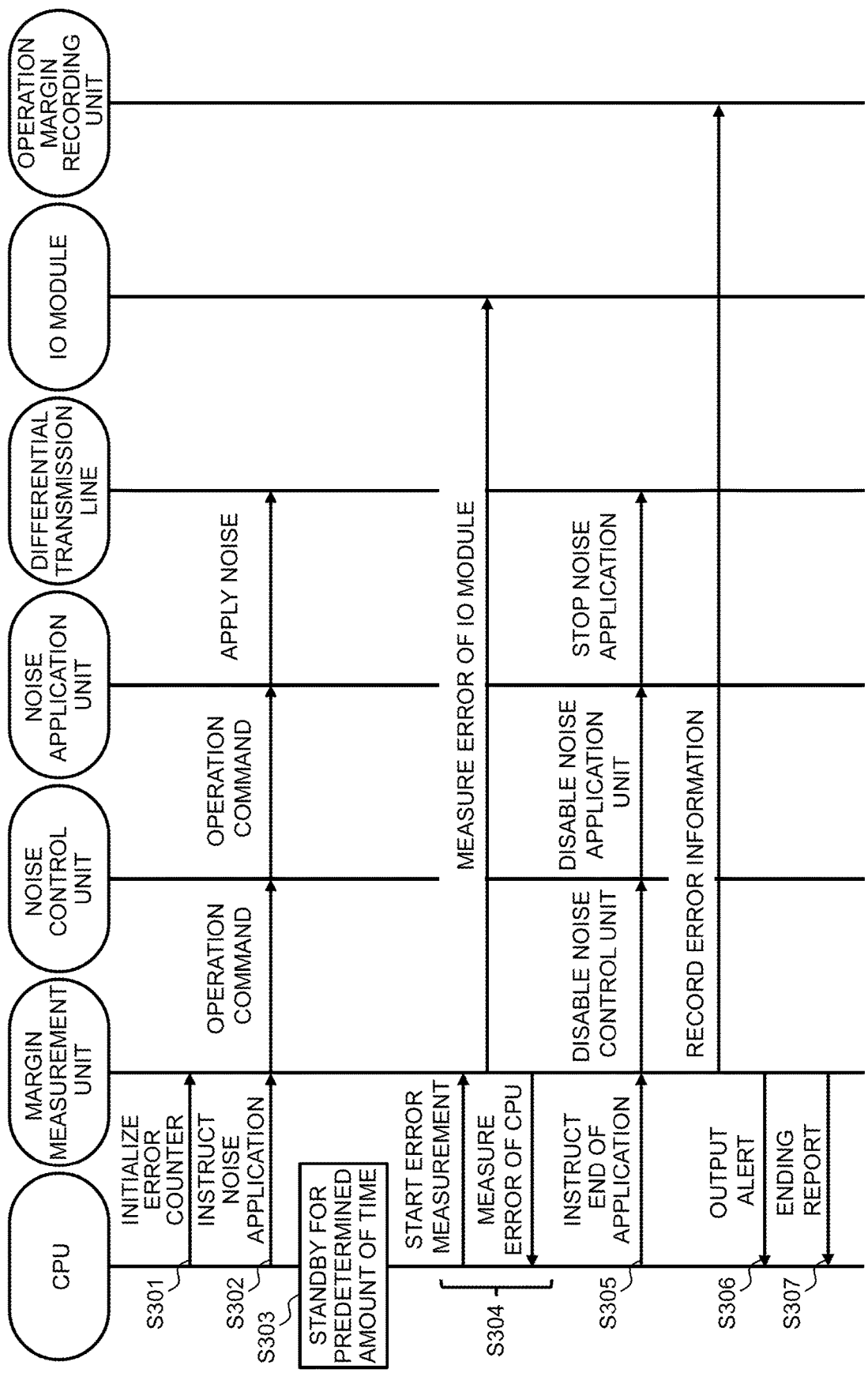
FIG. 11 is a timing chart corresponding to FIG. 10.

FIG. 11 is a timing chart corresponding to FIG. 10. In FIG. 11, time passes from the top of the Figure toward the bottom. Also, step Nos. corresponding to those in FIG. 10 are used in FIG. 11. First, in step S301, the CPU 2 commands the margin measurement unit 11 to perform initialization of the error counter. In the following step S302, the CPU 2 instructs the margin measurement unit 11 to perform nose application, and the margin measurement unit 11 applies nose to the differential transmission line via the noise control unit 5 and the noise application unit 6. The flow stands by for a predetermined amount of time in the following step S303, and error measurement is performed in step S304. Specifically, in step S304, the CPU 2 instructs the margin measurement unit 11 to start error measurement, and the margin measurement unit 11 measures errors of the I/O module 3 and the CPU 2.

In the subsequent step S305, the CPU 2 instructs the margin measurement unit 11 to end application, and application of nose to the differential transmission line via the noise control unit 5 and the noise application unit 6 is stopped. Thereafter, the margin measurement unit 11 records error information in the test results 14 in the margin recording unit 4. In the following step S306, the margin measurement unit 11 outputs an alert if there are errors, performs notification by the notification unit 15, and finally in step S307 reports that the margin measurement has ended.

Figure 12:
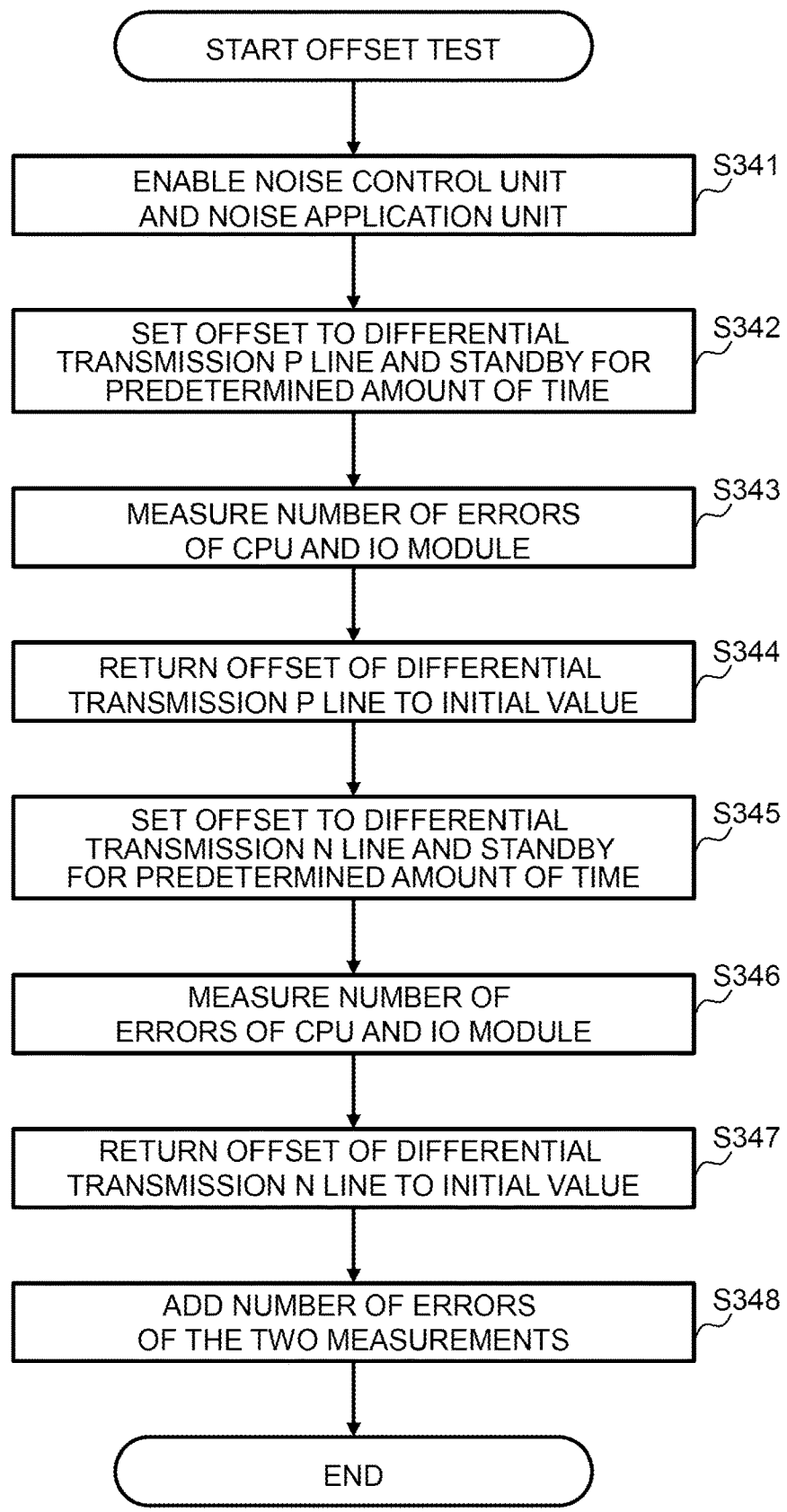
FIG. 12 is a flowchart showing detailed processing in offset testing.

FIG. 12 is a flowchart showing detailed processing in offset testing. The processing shown in FIG. 12 corresponds to steps S302 to S305 in FIG. 10. In step S341, the margin measurement unit 11 enables the noise control unit 5 and the noise application unit 6, i.e., starts operation thereof. The value of the offset current in this offset test is entered in the threshold value settings table 13, and is set to, for example, "0.5 mA" in the example shown in FIG. 2. In the following step S342, the margin measurement unit 11 sets the offset to the P line differential transmission line T, and stands by for a predetermined amount of time. In the following step S343, the margin measurement unit 11 measures the number of errors of the CPU and the I/O module. Thereafter, in step S344, the margin measurement unit 11 returns the offset of the P line differential transmission line to the initial value.

In the subsequent step S345, the margin measurement unit 11 sets the offset to the N line differential transmission line, and stands by for a predetermined amount of time. In the following step S346, the margin measurement unit 11 measures the number of errors of the CPU and the I/O module. Thereafter, in step S347, the margin measurement unit 11 returns the offset of the N line differential transmission line to the initial value. In the following step S348, the margin measurement unit 11 adds the number of errors measured in step S343 and step S346 for each of the CPU 2 and the I/O module 3, and ends the processing shown in FIG. 12.

Figure 13:
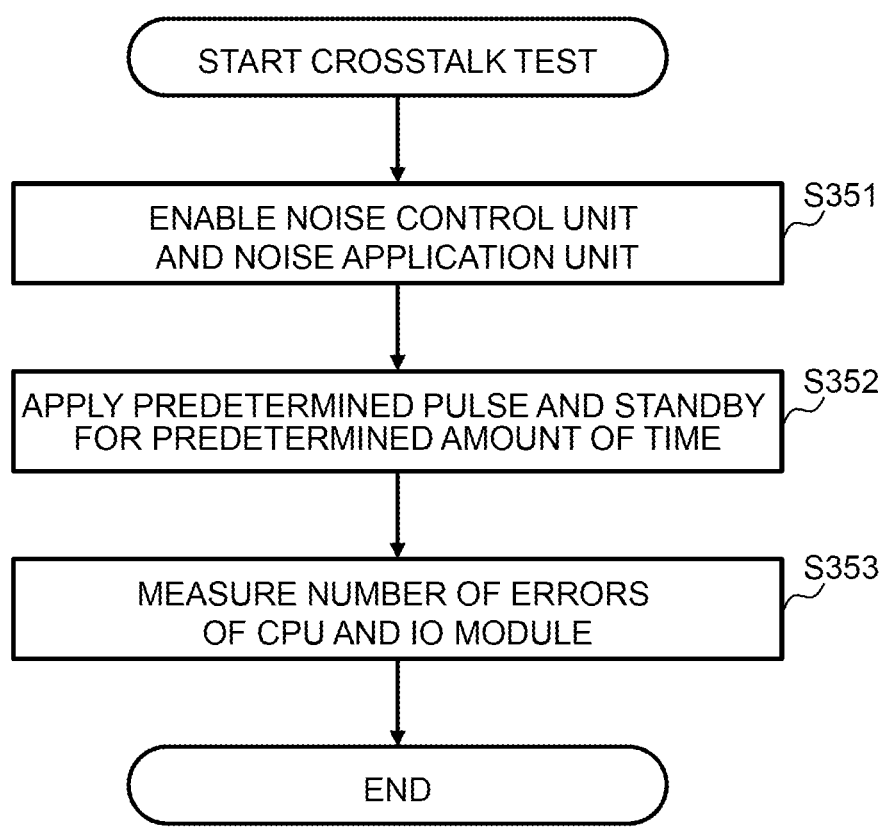
FIG. 13 is a flowchart showing detailed processing in crosstalk testing.

FIG. 13 is a flowchart showing detailed processing in crosstalk testing. The processing shown in FIG. 13 corresponds to steps S302 to S305 in FIG. 10. In step S351, the margin measurement unit 11 enables the noise control unit 5 and the noise application unit 6, i.e., starts operation thereof. In the following step S352, the margin measurement unit 11 applies a predetermined pulse to the testing wiring L for crosstalk testing, and stands by for a predetermined amount of time. The amplitude of the pulse applied in this step is entered in threshold value settings table 13, and is set to "200 mV" in the example shown in FIG. 2. In the following step S353, the margin measurement unit 11 measures the number of errors of the CPU and the I/O module, and ends the processing shown in FIG. 13.

According to the first embodiment described above, the following advantageous effects can be obtained.

(1) The computing apparatus 1 includes the CPU 2 and the I/O module 3, the differential transmission line T that couples the CPU 2 and the I/O module 3 to each other, the noise application unit 6 that applies noise to the differential transmission line T, the noise control unit 5 that controls the noise application unit 6, and the margin measurement unit 11 that measures the occurrence frequency of communication error between the CPU 2 and the I/O module 3. Accordingly, the operation margin can be measured while the computing apparatus 1 is operating.

(2) The computing apparatus 1 includes the margin recording unit 4 in which a result of measurement by the margin measurement unit 11 is recorded. Accordingly, whether or not there is a problem on the differential transmission line T can be distinguished by analyzing a log in the margin recording unit 4 when there is system trouble.

(3) The computing apparatus 1 includes the notification unit 15 that performs notification of a result of measurement by the margin measurement unit 11. Accordingly, by notifying the measurement result to the user, the user can be notified that there is little leeway in the margin, before trouble occurs. Also, this preventive maintenance enables communication defects to be prevented in advance, and the risk of data destruction can be reduced.

(4) The noise application unit 6 applies voltage or current to at least one of a pair of signal lines included in the differential transmission line T. Accordingly, the computing apparatus 1 can execute offset testing while the computing apparatus 1 is operating.

(5) The computing apparatus 1 includes testing wiring L that includes crosstalk testing wiring that is disposed in parallel with the pair of signal lines included in the differential transmission line T, over a predetermined section thereof. As illustrated in FIG. 8, a distance from the crosstalk testing wiring to a first signal line making up the pair of signal lines is different from a distance from the crosstalk testing wiring to a second signal line making up the pair of signal lines. The noise application unit 6 applies voltage to the crosstalk testing wiring. Accordingly, the computing apparatus 1 can execute crosstalk testing while the computing apparatus 1 is operating.

Modification 1

In the above-described embodiment, the CPU 2 and the I/O module 3 are coupled by the first differential transmission line T1 and the second differential transmission line T2. However, measurement of margin leeway on the differential transmission line is not limited to between the CPU 2 and the I/O module 3, and can be applied to various differential transmission lines.

Modification 2

In the above-described embodiment, the computing apparatus 1 executes both recording measurement results from the margin measurement unit 11 in the margin recording unit 4, and externally notifying the measurement results from the margin measurement unit 11 by the notification unit 15. However, it is sufficient for the computing apparatus 1 to perform at least one of recording measurement results from the margin measurement unit 11 in the margin recording unit 4 and externally notifying the measurement results from the margin measurement unit 11 by the notification unit 15. In this case, the configuration corresponding to the function that is not executed does not have to be provided. For example, in a case in which the computing apparatus 1 does not record measurement results from the margin measurement unit 11, the computing apparatus 1 does not have to include the margin recording unit 4. Also, for example, in a case in which the computing apparatus 1 does not externally notify the measurement results from the margin measurement unit 11, the computing apparatus 1 does not have to include the notification unit 15.

Modification 3

In the above-described embodiment, in the computing apparatus 1, the noise control unit 5 outputs commands for executing both offset testing and crosstalk testing to the noise application unit 6. However, it is sufficient for the noise control unit 5 to output commands for executing at least one of offset testing and crosstalk testing to the noise application unit 6. In this case, the testing wiring L built into the computing apparatus 1 only has to correspond to the test that the noise control unit 5 will output.

Modification 4

In the above-described embodiment, the computing apparatus 1 sets an interruption timer for margin measurement. However, using a timer is not an indispensable configuration, and for example, margin measurement may be performed just once on startup.

Modification 5

In offset testing, offset voltage may be applied to just one side of the pair of differential transmission lines. Specifically, in the flowchart shown in FIG. 12, just one of steps S342 to S344 and steps S345 to S347 may be executed.

Modification 6

The testing wiring L for crosstalk testing may be disposed near to the P-side route of the pair of differential transmission lines, and crosstalk testing may be performed. Further, wiring for crosstalk testing may be provided on both sides of the P-side and the N-side, with voltage being applied to both in order. That is to say, crosstalk testing cannot be performed if voltage is applied to both at the same time, and accordingly crosstalk testing may be performed for both of the P-side and the N-side by applying voltage to both at timings that are not the same timing.

In each of the above-described embodiments and modifications, the configurations of functional blocks are only exemplary. Several functional configurations illustrated as being separate functional blocks may be integrally configured, and a configuration represented by a single functional block diagram may be divided into two or more functions. Also, a configuration may be made in which part of functions that the functional blocks have are provided to other functional blocks.

The above-described embodiments and modifications may each be combined. Also, various embodiments and modifications have been described above, the present invention is not limited to the contents thereof. Other forms that are conceivable within the scope of the technical spirit of the present invention are also encompassed by the scope of the present invention.

What is claimed is:

1. A computing apparatus, comprising:
   a first apparatus and a second apparatus;
   a differential transmission line that couples the first apparatus and the second apparatus to each other;
   a current voltage source that applies noise to the differential transmission line; and
   a processor coupled to a memory storing instructions to permit the processor to function as:
      a noise control unit that controls the current voltage source; and
      a margin measurement unit that measures an occurrence frequency of communication error between the first apparatus and the second apparatus; and
   a crosstalk testing wiring that is disposed in parallel with a pair of signal lines included in the differential transmission line, over a predetermined section thereof,
   wherein a distance from the crosstalk testing wiring to a first signal line making up the pair of signal lines is different from a distance from the crosstalk testing wiring to a second signal line making up the pair of signal lines, and
   wherein the current voltage source applies voltage to the crosstalk testing wiring.

2. The computing apparatus according to claim 1, further comprising:
   a storage device in which a result of measurement by the margin measurement unit is recorded.

3. The computing apparatus according to claim 1,
   wherein the processor performs notification of a result of measurement by the margin measurement unit.

4. The computing apparatus according to claim 1, wherein the current voltage source applies voltage or current to at least one of a pair of signal lines included in the differential transmission line.

5. A margin measurement method that is executed by a computing apparatus, including a first apparatus, a second apparatus, and a differential transmission line that couples the first apparatus and the second apparatus to each other, the margin measurement method comprising:
   applying noise to the differential transmission line; and
   measuring an occurrence frequency of communication error between the first apparatus and the second apparatus,
   wherein a crosstalk testing wiring is disposed in parallel with a pair of signal lines included in the differential transmission line, over a predetermined section thereof,
   wherein a distance from the crosstalk testing wiring to a first signal line making up the pair of signal lines is different from a distance from the crosstalk testing wiring to a second signal line making up the pair of signal lines, and
   wherein a voltage is applied to the crosstalk testing wiring.

* * * * *